United States Patent [19]

Murphy, Jr.

[11] Patent Number: 5,231,508
[45] Date of Patent: Jul. 27, 1993

[54] HALL EFFECT GAUGE WITH MAGNETICALLY-SENSITIVE VARIABLE-RESISTANCE ELEMENT

[76] Inventor: Frank W. Murphy, Jr., Box 470248, Tulsa, Okla. 74147

[21] Appl. No.: 683,155

[22] Filed: Apr. 10, 1991

Related U.S. Application Data

[63] Continuation-in-part of Ser. No. 326,669, Mar. 21, 1989, Pat. No. 5,040,420, and a continuation-in-part of Ser. No. 580,975, Sep. 12, 1990, Pat. No. 5,121,109, which is a continuation-in-part of Ser. No. 399,810, Aug. 29, 1989, Pat. No. 4,975,687.

[51] Int. Cl.⁵ .............................. H01L 43/50
[52] U.S. Cl. ................. 338/32 H; 338/12; 338/36; 338/42; 73/725
[58] Field of Search .......... 338/32 H, 42, 12, 36; 340/688; 73/723, 725; 355/205, 206

[56] References Cited

U.S. PATENT DOCUMENTS

| | | |
|---|---|---|
| 1,743,401 | 1/1930 | Schlaich . |
| 2,923,786 | 2/1960 | Jones . |
| 3,111,033 | 11/1963 | Muzzi . |
| 3,114,903 | 12/1963 | Murphy et al. . |
| 3,129,416 | 4/1964 | Freedman . |
| 3,225,595 | 12/1965 | Dotto . |
| 3,314,061 | 4/1967 | Magagnos . |
| 3,369,397 | 2/1968 | Alth . |
| 3,375,718 | 4/1968 | Robinson et al. . |
| 3,586,799 | 6/1971 | Murphy . |
| 3,683,135 | 8/1972 | Oliver . |
| 3,689,835 | 9/1972 | Bickford . |
| 3,916,185 | 10/1975 | Jehly . |
| 3,924,086 | 12/1975 | Ochsner . |
| 4,021,627 | 5/1977 | Francisco . |
| 4,081,635 | 3/1978 | Moore . |
| 4,085,336 | 4/1978 | Miles . |
| 4,107,661 | 8/1978 | Crosby . |
| 4,161,659 | 7/1979 | Jacob . |
| 4,161,685 | 7/1979 | Jacob . |
| 4,213,021 | 7/1980 | Alexander . |
| 4,241,337 | 12/1980 | Prada . |
| 4,282,413 | 8/1981 | Simons et al. . |
| 4,340,877 | 7/1982 | Herden . |
| 4,361,048 | 11/1982 | Hüttinger . |
| 4,377,090 | 3/1983 | Seulen . |
| 4,482,884 | 11/1984 | Hauschild et al. . |
| 4,606,229 | 8/1986 | Spence . |
| 4,613,851 | 9/1986 | Hines . |
| 4,691,185 | 9/1987 | Loubier et al. . |
| 4,718,278 | 1/1988 | Bergsma . |
| 4,745,811 | 5/1988 | Gray . |
| 4,788,534 | 11/1988 | Engelhardt . |
| 4,817,419 | 4/1989 | Iden . |
| 4,966,041 | 10/1990 | Miyazaki ............... 338/32 H X |
| 4,975,687 | 12/1990 | Murphy, Jr. et al. ............ 340/688 |

FOREIGN PATENT DOCUMENTS 0017737 10/1980 European Pat. Off. .
991579 10/1951 France .
7900999 8/1980 Netherlands .

Primary Examiner—Marvin M. Lateef
Attorney, Agent, or Firm—Robert J. Koch

[57] ABSTRACT

A signaling gauge may utilize a magnetically actuated variable resistor made up of a plurality of noncaptivating, magnetically actuated switch elements, each of which is mounted in an influence zone of a path of a magnet carried on an arm of a condition sensor such as a gauge movement. The arm may be an indicating pointer of the gauge. The gauge may alternatively utilize a magnetically-sensitive, variable-resistance element in a contactless arrangement with a magnet. The variable resistance element may include a plurality of noncaptivating, magnetically actuated switch elements and associated resistors mounted in an influence zone of a path of a magnet. The contactless arrangement eliminates the need for electromechanical contacts.

14 Claims, 8 Drawing Sheets

HALL EFFECT GAUGE WITH MAGNETICALLY-SENSITIVE VARIABLE-RESISTANCE ELEMENT

BACKGROUND OF INVENTION

This is a Continuation-in-Part of U.S. patent application Ser. No. 07/326,669, filed Mar. 21, 1989, U.S. Pat. No. 5,040,420, the disclosure of which is expressly incorporated herein, and is a Continuation-in-Part of U.S. patent application Ser. No. 07/580,975 filed Sep. 12, 1990, U.S. Pat. No. 5,121,109 the disclosure of which is expressly incorporated herein, which is a Continuation-in-Part of U.S. Pat. No. 4,975,687.

FIELD OF THE INVENTION

The invention relates to magnetically variable resistors and their application in signalling and sending gauges, and more particularly to a magnetically-actuated sending gauge or unit with a magnetically-sensitive variable-resistance element.

DESCRIPTION OF THE RELATED TECHNOLOGY

Signalling and sending gauges are instruments or meters which are utilized to monitor various parameters such as temperature, pressure, liquid levels or various electric properties. These instruments are specifically configured to give an indication of the monitored condition.

In prior gauges, the sensed condition is typically detected by electromechanical contacts. One contact is located on the reading pointer or meter movement Additional contacts may be either fixed or adjustable and located in the travel path of the pointer contact. U.S. Pat. No. 3,586,799 and 4,021,627, the disclosures of which are expressly incorporated herein, show electromechanical contact signalling gauges. (Furthermore, various gauges of this type have been sold under the registered trademark SWICHGAGE® by Frank W. Murphy Mfr., Inc.)

Electromechanical signalling or sending gauges are quite adequate for a great number of purposes. They do, however, possess a number of shortcomings. The most significant shortcoming is the electrical contact integrity. The lifespan of electromechanical contacts is finite and depends on the number of operations in the environment to which they are exposed. Exposure to atmospheric conditions containing dirt, dust or various chemical gases can significantly degrade contact integrity and negatively impact on contact life span. As a result, frequent contact cleaning and/or replacement is necessitated.

A further drawback is the effect the mechanical contact has on the movement integrity. In order to establish, change or break the electrical contact, a force significant to the operation and accuracy of the meter must often be applied to the indicating pointer. This precludes or significantly complicates the utilization of sensitive or balanced meter movements in gauge or sender applications. Electromechanical contacts are quite bulky and do not lend themselves to installation on aircoil or D'Arsonval movements such as those found in automotive instruments or many electrical condition monitoring instruments.

Another significant disadvantage of electromechanical contacts is the possibility of spark production. According to the American Petroleum Institute, Class I Division II environments classified as hazardous may not contain electrical contacts which are capable of producing a spark. Such a contact may result in ignition of flammable gases which may be present. Standard electric or electromechanical contact signalling gauges must be isolated from this environment by either large, expensive explosion-proof enclosures or electronic barriers.

Another disadvantage of conventional electromechanical contacts is the inability to efficiently switch low levels. In addition, common electromechanical contacts are more expensive than Hall effect sensors.

Other signalling gauges have utilized opto-electronic sensors. This has not proved satisfactory in many applications because such gauges require hermetic sealing in order to operate for any period of time. Dust and dirt buildup significantly impairs the sensor, thereby rendering the gauge inoperative. The sealing provisions required add a significant expense to the production of the instruments. Utilization of Hall effect elements is more efficient than opto-electronic sensors. Hall sensors are not normally affected by dirt or light levels.

U.S. Pat. No. 4,975,687, the disclosure of which is expressly incorporated herein, shows a signalling gauge that detects a predetermined monitored point with a contactless element. A noncaptivating, magnetically actuated switch element is mounted in an influence zone of a path of a magnet carried by an indicating pointer of the gauge. Sender unit can contain a variable-resistance element to give an indication of a sensed condition.

In general, sender gauges include variable resistance elements to vary the signal (in the form of current) supplied to the indicating pointer of the gauge. These variable-resistance elements, such as wire wound boards and thin film resistors, typically include electromechanical contacts. The electromechanical contacts of variable-resistance elements suffer from many of the aforementioned drawbacks of electromechanical contacts used with indicating pointers of signalling gauges. Electromechanical contacts are highly susceptible to corrosive environments. Further, severe contact continuity problems result in vibration situations, such as those encountered on internal combustion engines.

SUMMARY OF THE INVENTION

It is an object of the invention to enhance the operational characteristics of signalling and sender gauges to overcome the operational limitations inherent in the utilization of electromechanical contacts in the variable resistance element in a signalling gauge. The signalling gauge, according to the invention, is a unique, versatile device which may accurately operate over long periods of time in hostile environments.

The signalling gauge is made up of a gauge movement which is arranged and connected to respond to a particular sensed condition. The sensed condition may be a pressure, temperature, or electrical characteristic. Examples of various movements which may be utilized are diaphragm, Bourdon tube, or D'Arsonval type movements. The movement may be connected to a reading pointer which typically passes over a gauge face plate or some other type of local indictor to provide a visual reading of the sensed condition. Alternatively, the movement may be located in a pure sender unit. A noncaptivating, magnetically actuated variable readout element such as a variable resistor may be arranged to cooperate with a magnet, typically mounted on an indicating pointer or another moving element responsive to a sensed condition. The noncaptivating property of the switch element is significant in order to avoid influencing the meter reading or damaging the meter movement. The mechanical resistance of electromechanical contacts influences the indicating needle and, therefore, affects the reading and the output of the meter. Utilization of a magnetic/mechanical switching element such as a reed switch also results in some mechanical influence on the indicating pointer or meter movement. Any such influence is to be avoided in order to prolong the lifespan of the meter and maintain reading integrity.

An example of a noncaptivating, magnetically actuated switch element is a Hall effect switching device such as, for example, a Hall effect transistor, digital switch, or latch The term "noncaptivating" is intended to preclude elements where the magnetic interaction between a switch element and the actuating magnet results in a force tending either to retard or induce relative motion between the switching element and the actuating magnet path.

A plurality of Hall effect transistors may be used in a variable-resistance element. Each Hall effect transistor is connected in series with an associated resistor to form a switch pair. The switch pairs may be connected in parallel in an electrical circuit.

Sending gauges may be set up to operate in a slide-by mode where a flux axis of the actuating magnet may be either perpendicular or parallel to a travel path of the magnet. A bipolar latch and a magnet axially aligned with the travel path may be configured with a leading activating pole of the magnet on an increasing reading or with a trailing activating pole, depending on the application and signal requirements.

The actuating magnet may be a very small, lightweight element such as a 32.5 milligram or one gram magnet. Various Hall effect elements may be utilized, such as a SPRAGUE UGS-3075U bipolar Hall effect digital latch or a UGS-3140U ultra-sensitive Hall effect switch, depending on desired circuit capabilities and properties.

According to a preferred embodiment, a control circuit may be connected to one or more gauges. The control circuit may control one or more functions depending on the operating parameters sensed by the gauges.

Typical applications of the magnetically sensitive gauges, according to the invention, include a variety of circuit applications. The sending gauges, according to the invention, may be utilized in any system where an indication of a sensed condition is required. The variable output of the sensing/sending gauges gives an accurate representation of a sensed condition such as temperature pressure or liquid level without influencing the sensing movement.

According to the invention, the gauge or sending unit may be calibrated or adjusted by locating the magnetically sensitive resistor on an adjustable mounting. The adjustable mounting preferably carries the noncaptivating magnetically actuated variable resistor, but may alternatively a switch activating element such as a magnet. Additional features will become apparent from the description of the preferred embodiment.

DETAILED DESCRIPTION OF THE PREFERRED EMBODIMENT

Figure 1:
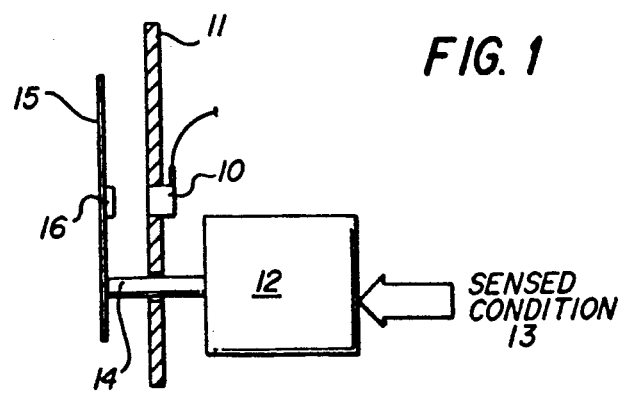
FIG. 1 shows a schematic of a signalling gauge.
Figure 2:
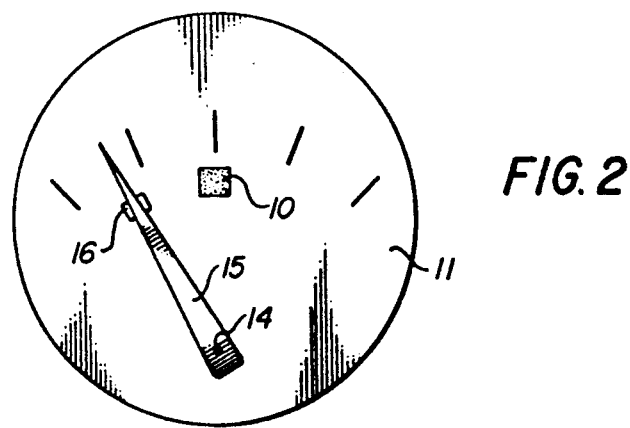
FIG. 2 shows a front view of the embodiment according to FIG. 1.

FIGS. 1 and 2 schematically illustrate an embodiment of a signalling gauge with a flush mounted Hall effect switching device 10 arranged on a face plate 11 of the signalling gauge. A meter movement 12 is provided which responds to a sensed condition 13. The sensed condition 13 may be pressure in the case of a Bourdon tube movement or an electrical potential in the case of a D'Arsonval movement. The movement 12 translates the magnitude of the sensed condition into rotational motion of a shaft 14 connected to an indicating pointer 15. A magnet 16 is mounted on the indicating pointer in such a fashion that its path carries it close enough to the Hall effect switching device 10 to influence switching of the element 10.

Figure 3:
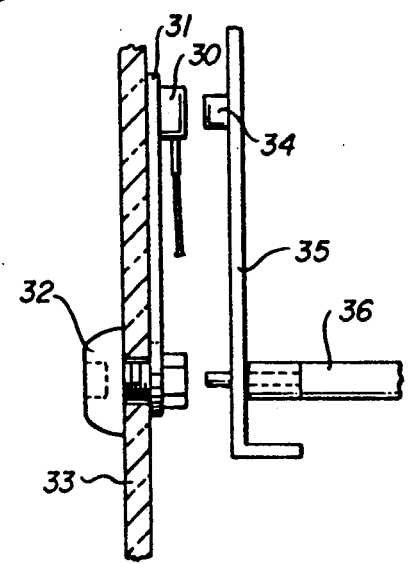
FIG. 3 shows a side view of an alternative embodiment with an adjustable contact arm.

FIG. 3 shows an embodiment with a Hall effect switching unit 30 mounted on an adjustable arm 31. The adjustable arm 31 is connected to an adjusting knob 32 which extends through a clear lens 33. The adjustable arm 31 may be pivoted in order to set the switching point of the signalling gauge. A magnet 34 is connected to a pointer 35. The pointer 35 is rotated by motion of the shaft or stand 36 controlled by the gauge movement (not shown). Alternatively, the pointer may be rotated by a crankarm and pivoted on a shaft in embodiments with a fixed shaft.

Figure 4:
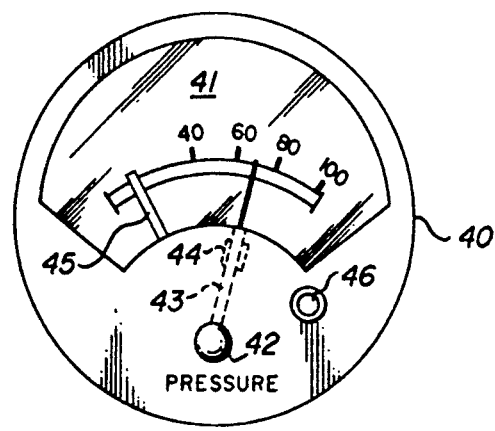
FIG. 4 shows a plan view of a signalling gauge according to the configuration of FIG. 3.
Figure 5:
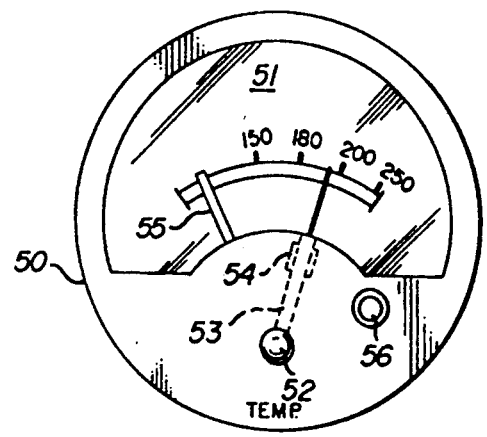
FIG. 5 shows a plan view of an alternative embodiment according to FIG. 3.

FIGS. 4 and 5 show two applications for the configuration illustrated in FIG. 3. Gauge 40 is adapted to monitor pressure while gauge 50 is adapted to monitor temperature. Each instrument contains a face plate 41, 51 which displays a graduated dial visible through a clear lens. Knobs 42, 52 are located on the front of the gauge and adapted to control the "contact" arms 43, 53. Each arm displays a Hall effect switching element 44, 54. An extension of the arm is provided as a visual indication of the location of the switch point. An indicating pointer 45, 55 is arranged to display the sensed reading of the gauge. The indicating pointers carry an activating magnet (not shown in the view of FIGS. 4 and 5) positioned to actuate or deactuate the Hall effect switching device on passage thereover. Each gauge may carry an LED signalling indicator 46, 56, as a visual indication that the predetermined set point has been attained. (optional)

Figure 6:
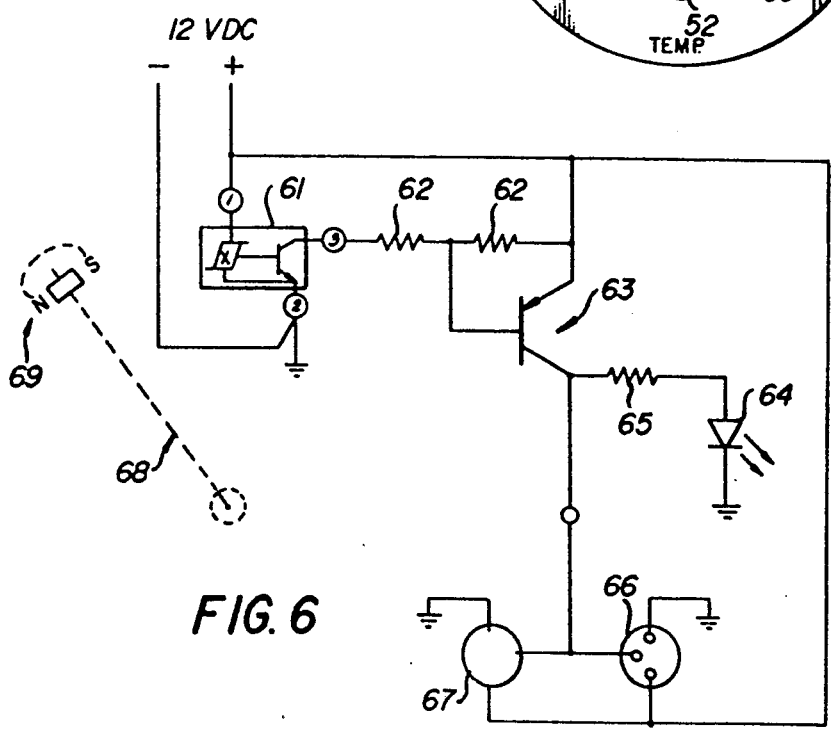
FIG. 6 shows a wiring diagram for an embodiment a signalling gauge.

FIG. 6 shows an electrical schematic of a signalling circuit according to an embodiment of the invention. A bipolar Hall effect digital latch 61 is utilized as the non-captivating magnetically actuated switch element. The Hall effect element may be a UGS-3075 manufactured by Sprague. The Hall effect element is connected through a voltage divider 62 to a switching transistor 63. The switching transistor may be connected to a signalling LED 64 through a resistor 65. Additionally, the switching transistor may be connected to control inputs of a flashing light element 66 and/or an electronic chime 67. In operation the indicating pointer, illustrated schematically at 68, sweeps the magnet 69 past the Hall effect element 61.

Figure 8:
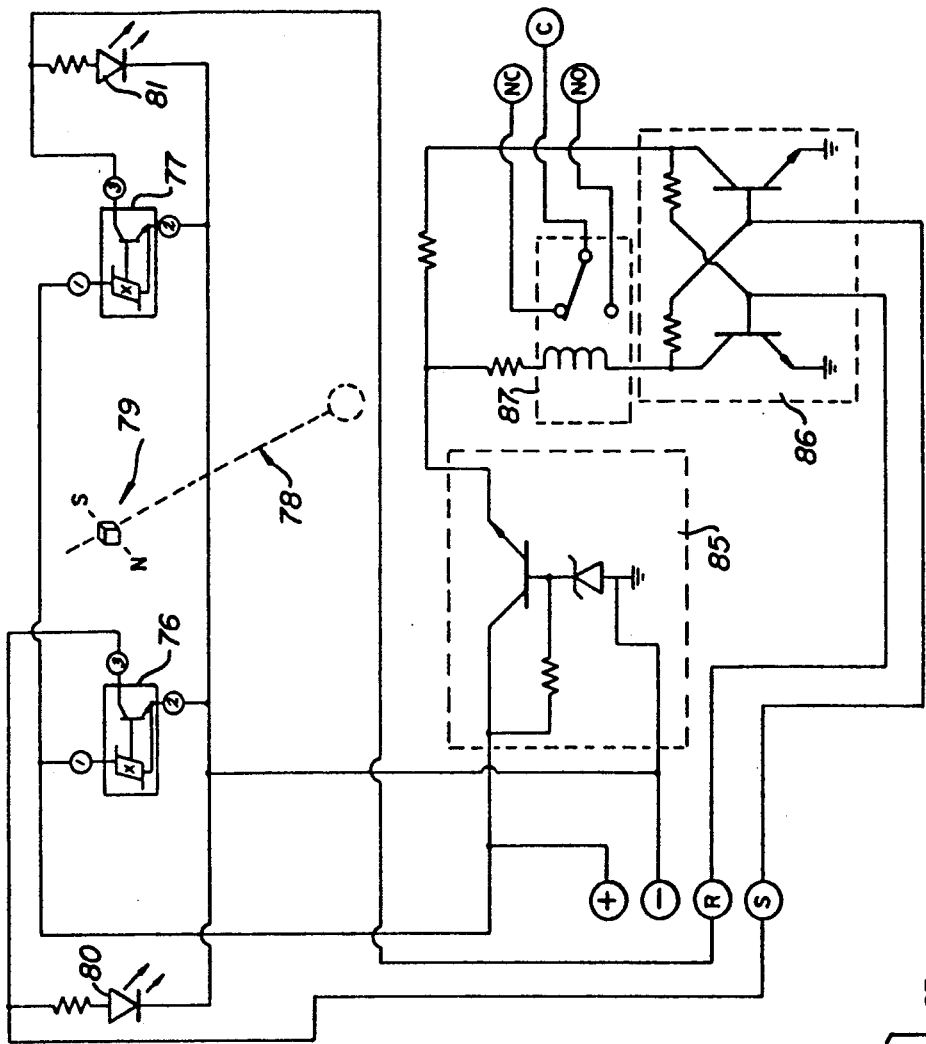
FIG. 8 shows a schematic circuit diagram for an alternative embodiment of a signalling gauge according to FIG. 7.
Figure 7:
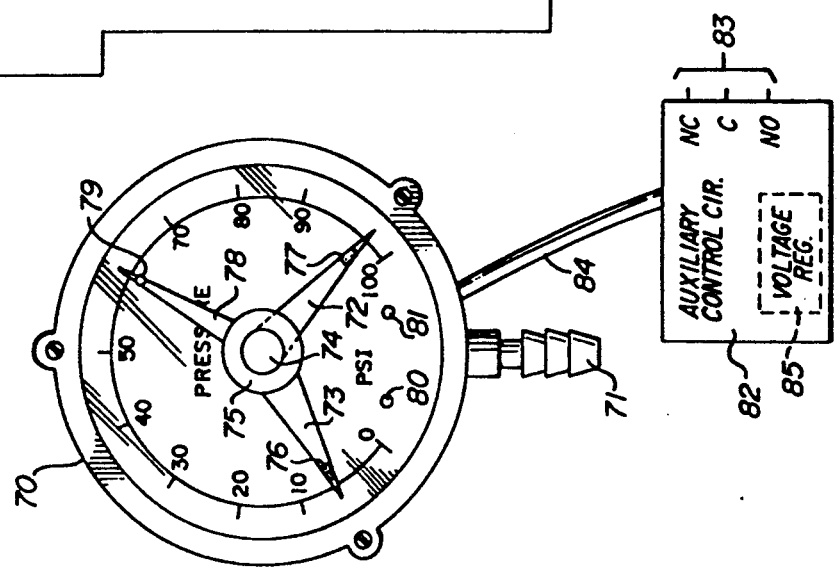
FIG. 7 shows a multi-contact signalling gauge.
Figure 9:
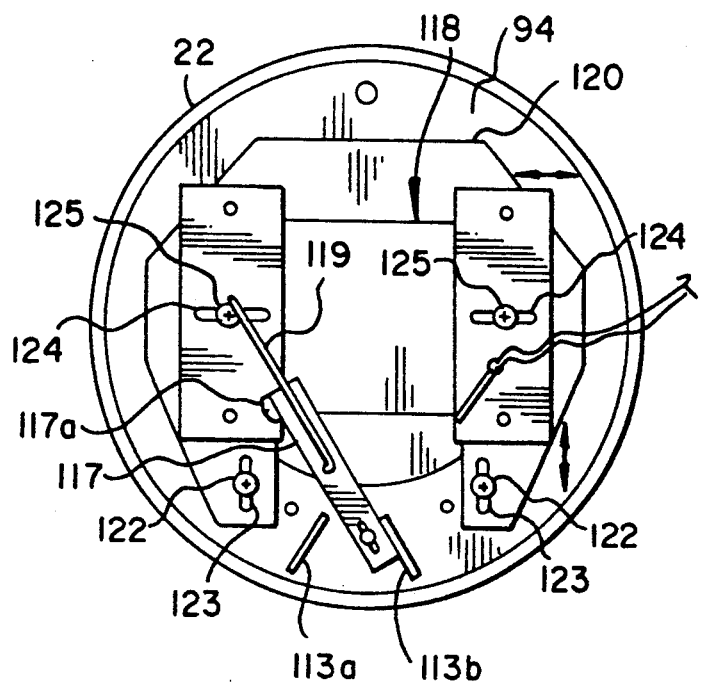
FIG. 9 is a top plan view of the meter movement or condition responsive sending unit.
Figure 10:
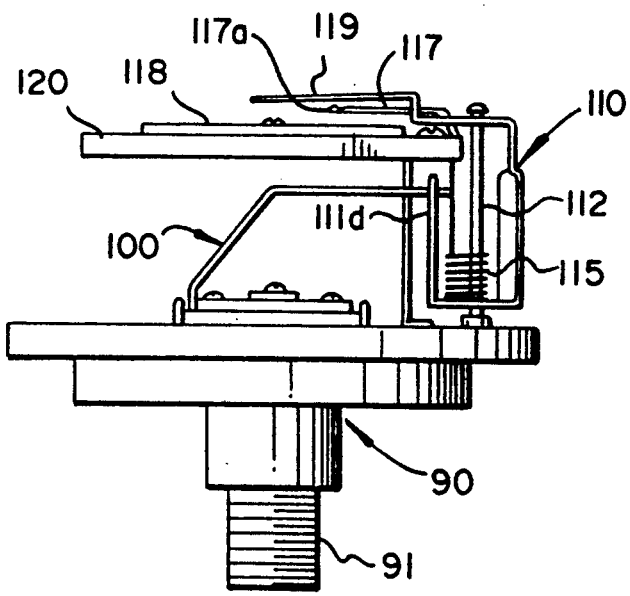
FIG. 10 is a side view in elevation of the meter movement or condition responsive unit of FIG. 9 with the housing removed.
Figure 11:
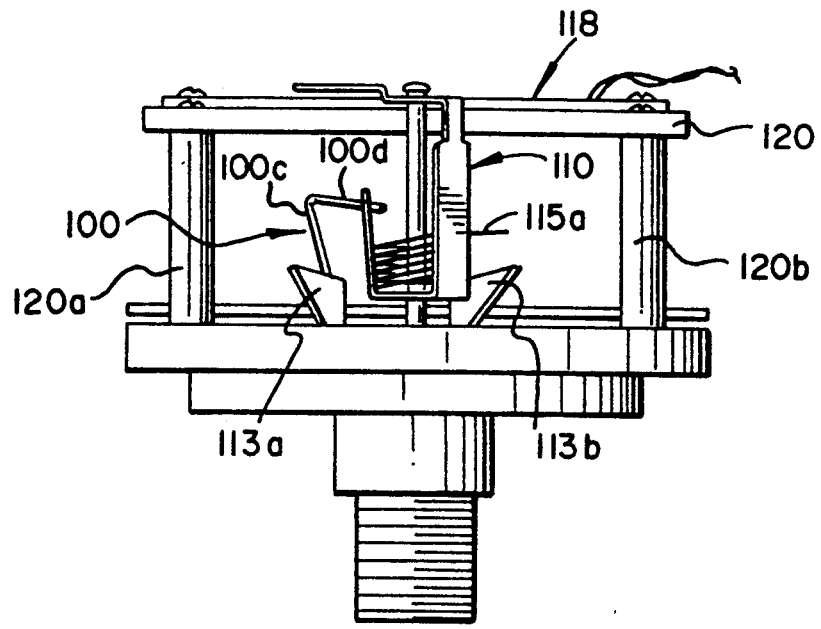
FIG. 11 is a front view in elevation of the meter movement or condition responsive unit of FIG. 9 with the housing removed.
Figure 12:
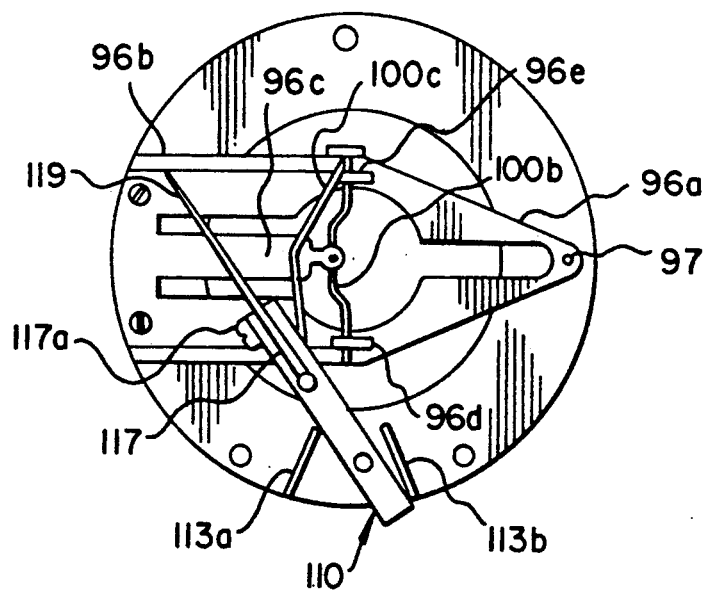
FIG. 12 is a top plan view of the meter movement or condition responsive unit of FIG. 9, with the variable-resistance element and housing removed.
Figure 13:
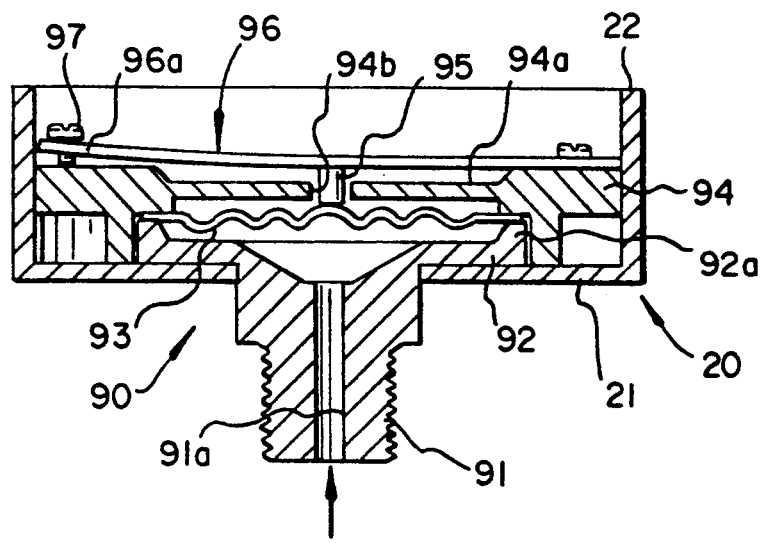
FIG. 13 is an enlarged vertical sectional view of a condition responsive component of the meter movement of FIG. 9.
Figure 14:
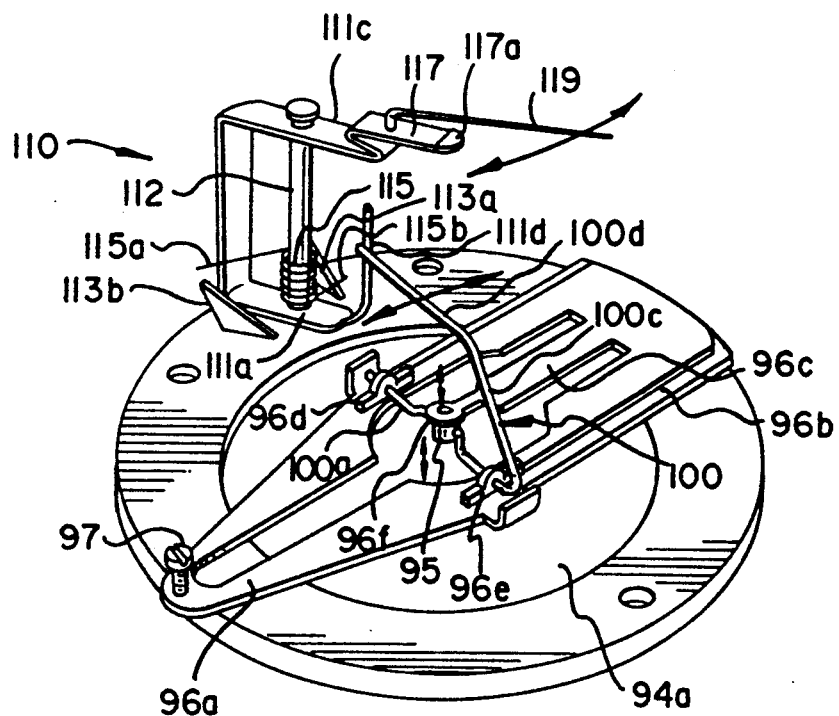
FIG. 14 is an enlarged top perspective view of the condition responsive component and movable contact according to the invention.

FIGS. 7 and 8 show a multiple contact signalling gauge. The signalling gauge is configured as a pressure meter 70. A pressure input port 71 is located on the pressure meter. Adjustable contact pointers 72, 73 are connected to knobs 74, 75 respectively. Adjustable pointer 73 carries a low set point Hall effect switch 76 and adjustable pointer 72 carries a high set point Hall effect switch 77. Switch elements 76, 77 may advantageously be ultra-sensitive Hall effect switches such as SPRAGUE, UGS-3140 switches. The switch elements 76, 77 are shown on the exterior sides of adjustable pointers 73, 72 for illustrative purposes only. The switching elements in practice are located on an opposing side of the pointers, facing the meter indicating pointer 78 which bears a magnet 79. The low set point switch element 76 is connected to a low set point switch "on" LED 80. The high set point switch 77 is connected to a high set point switch "on" LED 81. According to an advantageous embodiment, this setup may be utilized in order to maintain pressure in a monitored tank between amounts called for according to the adjustable pointers. The meter may, for example, be connected to an auxiliary control circuit 82 which in turn controls a pump (not shown) through a series of switched contacts 83. The auxiliary control circuit 82 may be connected by a lead 84 and located remotely. The auxiliary control circuit may include a voltage regulator 85. The Hall effect switch elements may be connected to a flip flop or latch circuit 86 which in turn controls a relay 87.

FIGS. 9-14 show an embodiment of the meter movement 12. Meter movement 12 includes a housing or case 20 having an apertured bottom wall 12 and an upstanding cylindrical side wall 22. A transparent cover (not shown) is secured over the open end of the side wall.

A condition responsive unit is also provided to sense and respond to the condition monitored. In FIGS. 9-14, for illustrative purposes only, a pressure responsive unit is shown. Pressure responsive element or component 90 is secured within housing 20 and includes a threaded connector 91 with an orifice 91a extending therethrough. The connector terminates in a radially enlarged annular wall 92 with an upstanding shoulder 92a on the outer periphery thereof. A diaphragm 93 is clamped at its outer periphery between the shoulder 92a and the bottom of a fixed plate 94 secured on top of the connector, and is moved or flexed in response to pressure sensed through the orifice 91a. A diaphragm button 95 is engaged at one end against the diaphragm and is slidable through an aperture 94b in the plate 94.

Spring plate 96 may be secured over fixed plate 94 in spanning relationship to a recessed area 94a through which the button 95 reciprocates, and includes a reduced width end portion 96a and a base end 96b. Base end 96b is fixedly secured to the top of the plate 94, while the end 96a is adjustable toward and away from the plate via screw 97. Spring arm 96c and pivot supports 96d, 96e are secured on top of the spring plate, with the free end 96f of spring arm 96c disposed in overlying relationship to button 95. Thus, as the pressure in orifice 91a increases, the diaphragm 93 flexes upwardly, causing button 95 to extend further through opening 94b and thereby engaging and pushing up on spring arm 96c. Calibration or adjustment of the spring plate can be accomplished by adjusting screw 97.

A crank arm 100 has one end 100a pivotally supported by the pivot supports 96d, 96e, and includes an offset portion 100b between the pivot supports and in alignment with button 95, whereby as the button is extended upwardly through the opening 94b, it engages the offset portion 100b and causes the crank arm to pivot or rotate about its axis. This causes angularly extending portions 100c, 100d to swing or move laterally as indicated by the arrows in FIG. 14.

Pointer mechanism 110 is pivoted on top of plate 94 at one side thereof and includes a generally U-shaped structure having a first horizontal arm 111a pivotally engaged on pivot shaft 112, a vertically extending portion 111b and a second horizontal arm 111c spaced above first arm 111a and also pivotally engaged on pivot shaft 112. A pointer pin 111d extends upwardly from the free end of first arm 111a into a position of engagement with upper free end 100d of the crank arm 100.

Stops 113a, 113b are provided on top of plate 94 at either side of the pointer mechanism 110 to contact and thereby limit the pivoting movement of the pointer between two extremes as defined by the stops.

Coil spring 115 is disposed around the pivot shaft 112 and has one end 115a thereof engaged against the vertically extending portion 111b of the pointer and the other end 115b engaged against the stop 113a, whereby the pointer is biased in a clockwise direction as viewed from the top. However, the spring arm 96c, acting through the crank arm 100, holds the pointer to the counter-clockwise position against stop 113b, as shown in the Figures.

As seen best in FIGS. 9, 10, 11 and 14, a magnet 117a is carried on a magnet carrier 117, which is located at the outer end of the second horizontal arm 111c for contactless, floating engagement with variable-resistance element 118 that is supported on top of a support platform 120 mounted on top of a pair of upright stanchions 120a, 120b. A needle or pointer 119 may be secured to either arm 111c or magnet carrier 117 and projects substantially beyond the end of arm 111c.

Support platform 120 is secured on top of the stanchions via screws 81 and slots 82, whereby the support platform may be moved laterally relative to plate 94 and pivot shaft 112, and magnetically sensitive variable resistor or variable-resistance element 118 is secured on top of the support platform via slots 83 and screws 84, whereby magnetically sensitive variable resistor 118 may be moved laterally from side to side on the support platform. Thus, the magnetically sensitive variable resistor may be moved in plural directions relative to the pivot shaft 112 for adjusting the zero or set point of the pointer relative to the magnetically sensitive variable resistor (side-to-side movement of the resistance element via slots 83), and the sensitivity or rate of response of the pointer to pressure changes may be adjusted via slots 82 by moving the support platform and thus the resistance element toward and away from the pivot shaft.

Figure 15:
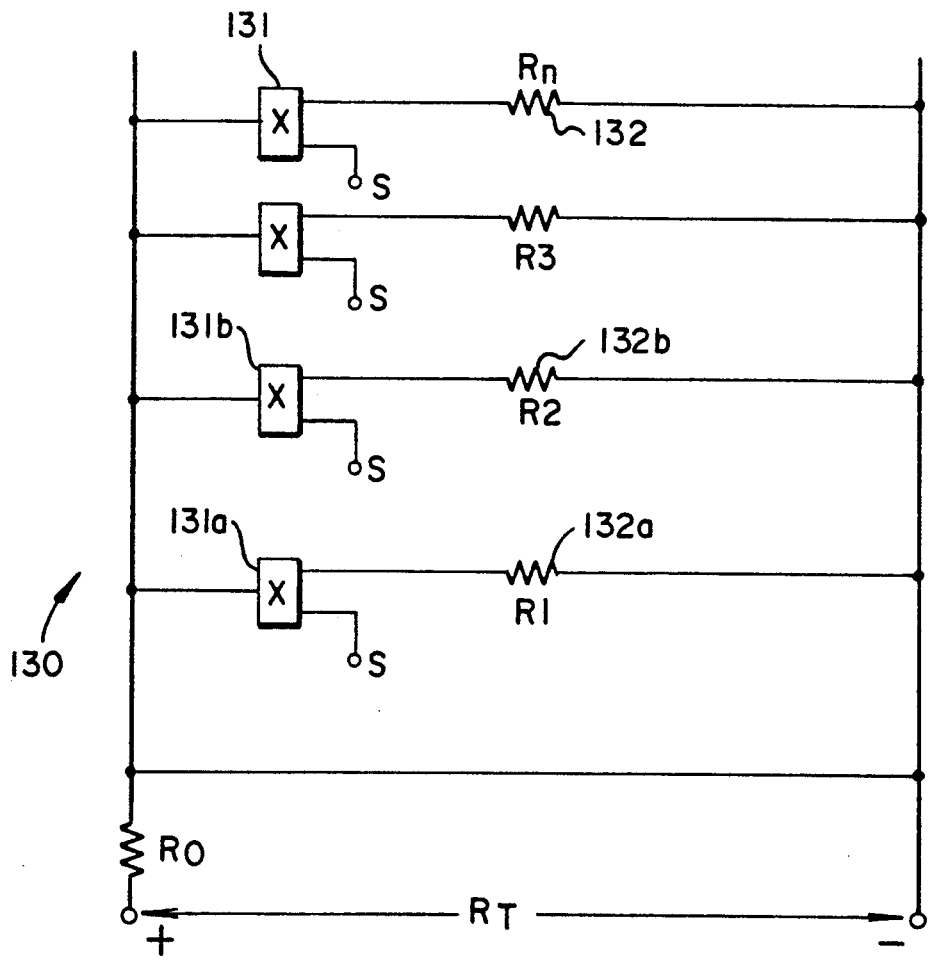
FIG. 15 is a schematic of the variable-resistance element of the invention.
Figure 16:
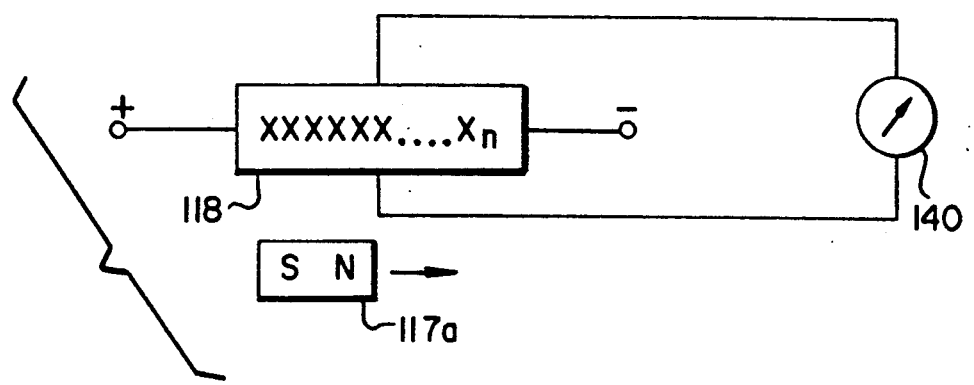
FIG. 16 is a schematic of the variable-resistance element of the invention connected to a gauge.
Figure 17:
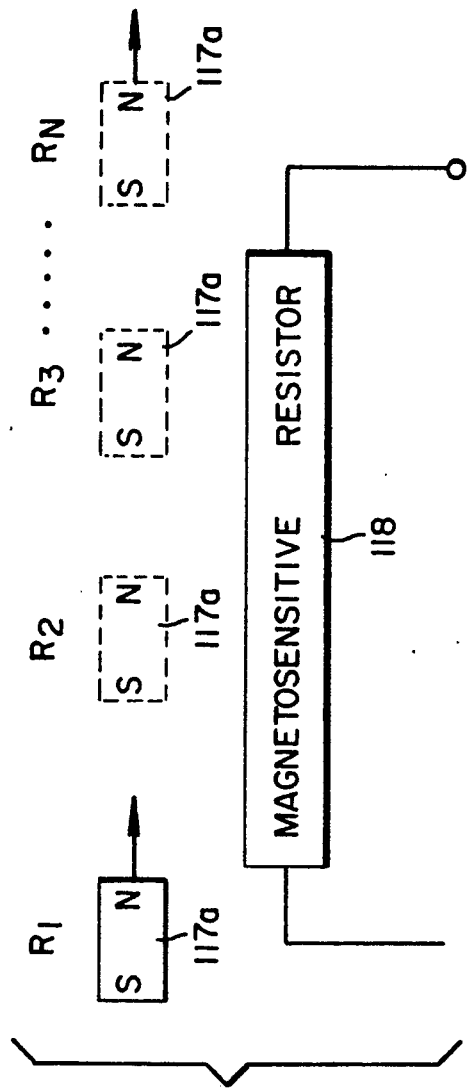
FIG. 17 is an enlarged side view in elevation of a magnet and a variable-resistance element according to the invention.
Figure 18:
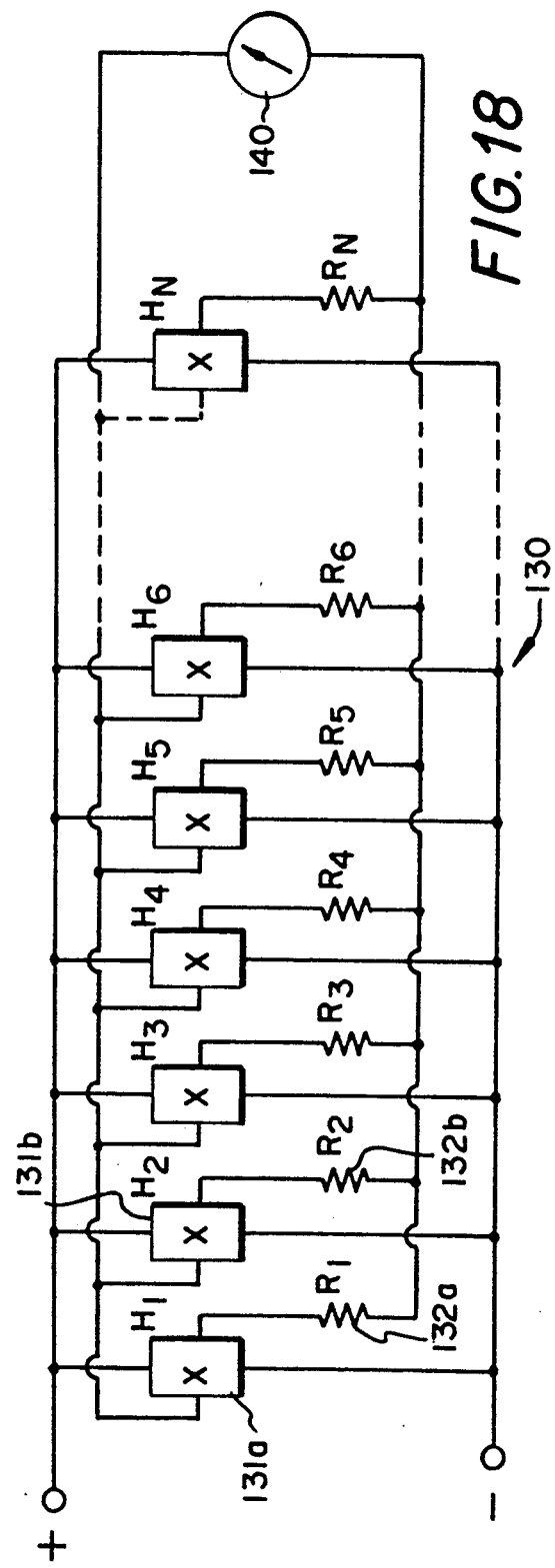
FIG. 18 is a schematic in detail of the variable-resistance element of the invention connected to a gauge.

FIGS. 15-18 show magnetically sensitive variable resistor 118 according to the invention. FIG. 15 shows an electrical circuit 130, which is carried by magnetically sensitive variable resistor 118. The magnetically sensitive variable resistor may be made up of a plurality of Hall effect devices 131. Each Hall effect device is actuated by magnet 117a. The magnetically sensitive variable resistor may have any number of Hall effect devices. Preferably 50-100 Hall effect transistors are integrated onto a common substrate which is approximately 1" in length. Each Hall effect device is connected in series with an associated resistor. Each resistor may have the same resistance or the resistive values may vary over the length of the substrate. Each Hall effect device and its associated resistor form a switch pair. For example, Hall effect device 131a and resistor 132a form a switch pair. All switch pairs in the electrical circuit are arranged in parallel. Accordingly, the resistors are also arranged in parallel. The magnetically sensitive variable resistor or variable resistance element is based on the concept that adding parallel resistors to an electrical circuit lowers the total resistance $R_T$ of the circuit. Conversely, removing parallel resistors from an electrical circuit increases the total resistance $R_T$ of the circuit. For a constant voltage source, a change in resistance will result in a change in current. Meter m can be calibrated to indicate a given pressure or other condition level, i.e., temperature, from the current value of the magnetically sensitive variable resistor. The Hall effect device may be a latch device, such as a SPRAGUE UGS-3075U bipolar Hall effect digital latch. The output transistor of the latch is normally off. Thus, the Hall effect device shunts its associated resistor A magnet may actuate the Hall effect device so the output transistor is on, which adds the associated resistor to the circuit and lowers the overall resistance of the electrical circuit. According to an embodiment of the invention, the magnetically sensitive variable resistor may have an initial resistance Ro of 200 ohms. The current level based on Ro=200Ω can be calibrated as the set point for the indicator gauge. The parallel resistors are preferably 10Ω resistors. It is preferable to use a Hall effect latch device so the Hall effect device is turned on by the south pole of magnet 117a with an accompanying decrease in resistance $R_T$ and remains on, i.e., it latches to on, until the north pole of magnet 117a turns off the Hall effect device with an accompanying increase in circuit resistance $R_T$.

In its simplest form, the pressure responsive sending unit of the invention could be used in connection with a remote battery-driven d'Arsonval type meter movement circuit. A suitable battery (not shown) such as a 12 volt automobile battery, for example, may be connected to one side of a meter movement coil (not shown). The other side of the coil may be connected to one end of the magnetically sensitive variable resistor 118, and the circuit is completed through the magnetically sensitive variable resistor to ground. At zero or a predetermined low pressure input, a high resistance exists in the circuit and the magnet and pointer are in the counter-clockwise position indicated in FIGS. 9 and 12. As pressure is increased, the diaphragm pushes the button 95 upwardly against the resistance of the spring arm 96c, rotating the crank arm and causing the pointer mechanism to pivot about pivot shaft 112, moving magnet 117a across the magnetically sensitive variable resistor which is mounted in an influence zone of a path of the magnet and decreasing the resistance in the circuit to a minimum value as additional Hall effect latches are turned on. Since one end of the variable resistance element is electrically connected to the meter, and the pointer mechanism 110 is electrically connected to the other end of the meter, the device of the invention enables an indication to be obtained on an electrical meter for a condition (pressure) at a remote location. Alternatively, the signal or resistance of the magnetically sensitive variable resistor can be used as a control signal. This arrangement would be used, for example, in association with some commercially available European meter movements.

An alternative arrangement to the above can be obtained by causing the resistance to increase as the amount of pressure sensed is increased. This is achieved by reversing the polar orientation of the actuating magnet. After initialization to the "all on" or low resistance state, the variable resistor resistance will be progressively increased as the trailing North pole of the magnet turns "off" successive Hall pairs. The meter may be connected to the opposite end of the magnetically sensitive variable resistor. For instance, the pressure responsive device could be mounted in operative association with an oil pressure galley in an automobile and wired to a gauge or meter on the instrumental panel. The gauge or meter (voltmeter) could be calibrated in pounds per square inch and would thus indicate the oil pressure sensed at the remotely located sending unit.

The illustrated embodiments are shown by way of example. The spirit and scope of the invention is not to be restricted by the preferred embodiment shown.

I claim:

1. A condition-responsive unit comprising:
   a sensing element responsive to a sensed condition;
   a moving member, carrying a magnet, responsive to said sensing element; and
   a noncaptivating magnetically actuated variable resistor mounted in an influence zone of a path of said magnet.

2. A condition-responsive unit according to claim 1, wherein said variable resistor further comprises:
   a plurality of resistors each connected to and associated with one of a plurality of noncaptivating, magnetically actuated switch elements.

3. A condition-responsive unit according to claim 2, wherein at least one of said noncaptivating, magnetically actuated switch elements is a Hall effect device.

4. A condition-responsive unit according to claim 2, wherein at least two of said noncaptivating, magnetically actuated switch elements are connected in parallel.

5. A noncaptivating variable output element comprising:
   a base element;
   a plurality of resistors arranged in an electrical circuit and distributed along said base element; and
   a plurality of magnetically actuated noncaptivating switch elements distributed along said base element;
   wherein each one of said resistors is connected to one of said magnetically actuated noncaptivating switch elements.

6. A noncaptivating variable output element according to claim 5, wherein said switch elements are Hall effect elements.

7. A noncaptivating variable output element according to claim 5, wherein said base element is a substrate.

8. A noncaptivating variable output element according to claim 5, wherein said base element is a substrate, and
   said Hall effect elements and said resistors are integrated along said substrate.

9. A noncaptivating variable output element according to claim 5, wherein said base element is a substrate and said magnetically actuated noncaptivating switch elements are Hall effect elements, further comprising:
   a condition sensing element translating a sensed condition into a mechanical movement;
   an arm operatively connected to said condition-sensing element responsive to said mechanical movement;
   a magnet disposed on said arm;
   wherein said substrate is positioned so that said Hall effect elements are in an influence zone of a path of said magnet.

10. A noncaptivating variable output element according to claim 9 wherein said condition-sensing element is a pressure sender unit.

11. A noncaptivating variable output element according to claim 10 wherein said pressure sender unit is a diaphragm gauge.

12. A noncaptivating variable output element according to claim 9, wherein said arm is a gauge pointer and said substrate is located on a gauge face plate.

13. A condition-responsive sending unit for sensing a condition and transmitting a signal indicative of the sensed condition to a remote location, comprising:
   a mechanically reacting condition sensing element;
   a magnet attached to said sensing element;
   a noncaptivating, magnetically activated variable output signal generator proximate to a travel path of said magnet.

14. A condition-responsive sending unit according to claim 13, further comprising a remote located indicator responsive to said signal generator.

* * * * *